United States Patent [19]
Doemen et al.

[11] 3,780,363
[45] Dec. 18, 1973

[54] BRUSHLESS DYNAMO ELECTRIC MACHINE, PARTICULARLY ELECTRIC MOTOR

[75] Inventors: Benno Doemen; Rolf Muller, both of St. Georgen, Germany

[73] Assignee: Papst-Motoren KG, St. Georgen/Schwarzwald, Germany

[22] Filed: May 1, 1972

[21] Appl. No.: 248,879

[30] Foreign Application Priority Data
May 3, 1971    Germany.................. P 21 21 551.0

[52] U.S. Cl. .............................................. 318/254
[51] Int. Cl. ........................................... H02k 29/00
[58] Field of Search................... 318/138, 171, 254, 318/227

[56] References Cited
UNITED STATES PATENTS

| | | | |
|---|---|---|---|
| 3,416,057 | 12/1968 | Froyd................................. | 318/138 |
| 3,473,069 | 10/1969 | Herbert.............................. | 318/138 |
| 3,250,066 | 5/1966 | Engelhardt......................... | 318/138 |
| 3,264,538 | 8/1966 | Brailsford ......................... | 318/138 |
| 3,324,368 | 6/1967 | Delden.............................. | 318/227 |
| 3,373,328 | 3/1968 | Hobo................................. | 318/138 |

*Primary Examiner*—Bernard A. Gilheany
*Assistant Examiner*—Thomas Langer
*Attorney*—Flynn & Frishauf

[57] ABSTRACT

An a-c motor structure, such as a shaded pole motor, hysteresis motor or the like, has a pair of main motor windings, which are selectively connected by controllable semi-conductor switches, such as switching transistors, to the supply terminals of a d-c source. To prevent switching currents from flowing in the non-energized winding, and effect a braking torque, a pair of switching amplifiers are provided which are controlled by the main motor windings and, in turn, have only low back current. To provide for rapid starting, the switching amplifiers are energized from the d-c source over a controlled semi-conductor switch, an oscillator controlling the switching rate thereof, the oscillator being voltage-sensitive and increasing in frequency with increasing supply voltage, and being likewise connected to the d-c motor terminal. The motor windings may be wound to be bifilar, tightly coupled inductively by the motor core structure, with diodes bypassing the switching transistors, poled oppositely to the conduction path of the switching transistors.

8 Claims, 4 Drawing Figures

BRUSHLESS DYNAMO ELECTRIC MACHINE, PARTICULARLY ELECTRIC MOTOR

The present invention relates to brushless dynamo electric machines, especially motors, and more particularly to a combination push-pull inverter to supply an a-c motor structure, having an inductive winding, from a d-c source.

It has previously been proposed to operate brushless, a-c motor structures from a d-c source by interposing an inverter, preferably a semi-conductor inverter which can be part of the entire motor assembly. In one form, the windings of the motor are center tapped and connected to one terminal of the d-c source, the other end terminals of the windings being selectively connected by means of semi-conductor switches, such as switching transistors, to the other terminal of the source. The combination of the semi-conductors, together with the inductivity of the motor windings and other electric circuit components form an oscillatory circuit to inherently provide alternating switching of the semi-conductor switching elements and thus application of current, alternatingly, to the motor windings.

Inverters of this type, combined with motors, have some disadvantages which are principally connected with poor starting torque, sensitivity to overloading, and inductive peaks which require semi-conductor elements of high inverse voltage capability, and inefficient use of the components.

It is an object of the present invention to improve a-c brushless motors, and more particularly the combination of a d-c to a-c inverter circuit with an a-c motor structure.

Subject matter of the present invention: Briefly, and to improve torque characteristics of the motor, particularly during starting, the semi-conductor switches are not directly controlled by the inductively arising voltages in the motor windings but, rather, an amplifier stage is interposed between the semi-conductor switches and the windings, to isolate the switching elements, typically switching transistors, from the main motor windings and to decrease any control currents flowing in the winding not directly energized for operation of the motor, and which might cause braking torques. In accordance with a feature of the invention, windings of the motor are wound to be bifilar, tightly coupled together by the iron core structure of the motor, and diodes are connected in parallel with the current paths of the semi-conductor elements, and poled oppositely thereto, to provide good control of the semi-conductors, with minimum stray voltage peaks, which would otherwise require expensive semi-conductor elements of high inverse voltage characteristics.

The base currents which, previously, have controlled transistors connected to the windings of a motor can be quite high. If these base currents are derived from the half of the winding which is not energized from the supply source, that is, which is not providing driving force to the motor, then these base currents will flow through the motor winding half which is not currently generating torque for the motor and provide a counter field, directed magnetically contrary to the driving or rotation-causing field of the motor. This field acts as a braking field and, therefore, detracts from the efficiency of operation of the motor. In accordance with the invention, the currents causing this field are held to a minimum so that the field itself can be neglected and the decrease in motor torque, while using the motor windings themselves as inductances in the switching circuits, will be negligible.

The invention will be described by way of example with reference to the accompanying drawings, wherein.

Throughout the specification, the same reference numerals are applied to the same components and these components are described only once.

Figure 1:
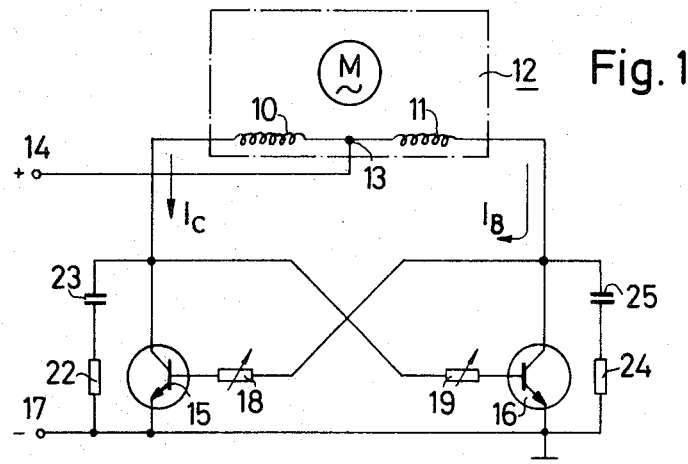
FIG. 1 illustrates, in schematic diagram, the basic structure of a brushless d-c motor using an a-c motor structure.

FIG. 1: A motor 12 is connected to the positive and negative terminals 14, 17 of d-c supply source, not shown. The motor structure 12 has a rotor M and a pair of energization windings 10, 11, which are center tapped at 13. Center tap 13 is connected to positive terminal 14 of the d-c source. The motor may be any suitable type of a-c motor structure, such as shaded pole, synchronous, induction, repulsion-induction, series-wound, or hysteresis. In the example, motor structure 12 is a shaded pole motor. It can be used, for example, from a battery such as a motor vehicle battery of nominal output voltage 12 or 14V, to supply fans, small appliances and the like.

The outer ends of the winding halves 10 are connected to the collector, each, of an npn power switching transistor 15, 16, respectively. The emitters of transistors 16, 16 are connected to chassis, and to the negative terminal 17 of the d-c source. Transistors 15, 16 are preferably selected for matching pairs, so that their characteristics are as closely matched as possible.

The base of transistor 15 is connected over a controlled resistance 18 with the outer terminal of winding 11; the base of transistor 16 is connected over a controllable resistance 19 with the outer end of motor winding 10. RC circuits including resistances 22, 24 and condensers 23, 25, each, in series, are connected across the emitter-collector paths of transistors 15, 16, respectively.

Operation: After the two transistors 15, 16 are connected to the source at terminals 14, 17, one of the transistors 15 or 16 will have a conductive emitter-collector path. Let it be assumed that transistor 15 is conductive. This causes current to flow in the half of the winding 10. Current will flow until the collector current will saturate, at which point it will suddenly cease from changing. This causes a sudden flux change in the windings 10, 11. The termination in change of flux stop application of holding voltage from the half 11 of the winding over resistance 18 to the base of transistor 15, which will quickly block. Simultaneously, the negative pulse at the winding 10 causes a positive relative voltage to appear at the base of the transistor 16 which now becomes conductive, and current will then flow through winding 11, rather than through winding 10. This cycle of periodic opening and closing, or blocking and conducting of the transistors 15, 16 will continue with essentially constant frequency. Resistances 18, 19 can influence this frequency to some extent which, otherwise, is determined by the inductances of windings 10, 11. To stabilize the two transistors with respect to temperature, an NTC resistance can be connected between the bases, respectively, of the transistors 15, 16, and chassis or ground terminal 17.

The RC circuits 22, 23, and 24, 25 suppress voltage peaks which occur when transistors 15, 16, respectively, suddenly block. The capacitors 23, 25 are charged over the resistors 22, 24, respectively, thereby suppressing dangerous voltage peaks. Voltage peaks which arise in the supply lines connected to terminals 14, 17 are likewise suppressed, and motor M runs smoothly. The energy losses in the circuit are comparatively small.

Figure 2:
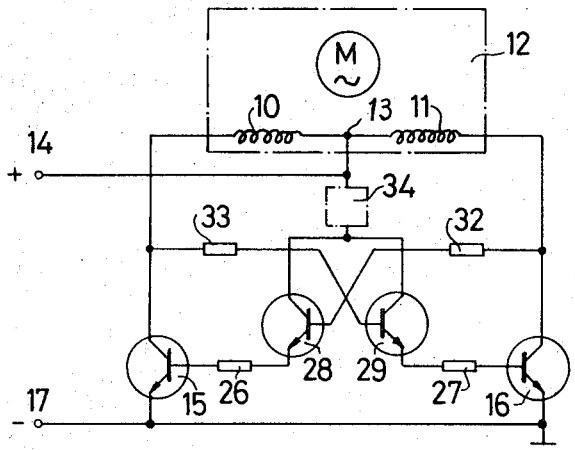
FIG. 2 is a circuit diagram of the motor-inverter combination in accordance with the present invention.

During the time that transistor 15 is conductive, it will have a collector current $I_c$. This collector current will flow through the left winding half 10. Simultaneously, the right winding half 11 will, however, carry the base current $I_B$ to the base of transistor 15 in order to hold this transistor conductive. The currents $I_C$ and $I_B$ are directed in opposition to each other, and thus cause oppositely directed fields in the windings 10, 11. In other words, the field in winding 11 decreases the field due to winding 10, which drives the motor. If, for example, the base current is 10 percent of the collector current, then the driving field for the motor 12 is decreased by about 10 percent. This is an undesirable effect of this circuit, and is avoided, in accordance with the present invention, as seen in FIG. 2.

The two power transistors 15, 16 each have an amplifier transistor 28, 29, which again may be npn switching transistors associated therewith. The base of transistor 15 is connected over resistance 26 with the emitter of transistor 28; the base of transistor 16 is connected over resistance 27 with the emitter of transistor 29. The base of transistor 28 is connected over an adjustable resistance 32 with the outer end of winding 11, and the base of transistor 29 is connected over a likewise adjustable resistance 33 with the outer end of winding 10. The collectors of transistors 28, 29 are interconnected together and are connected over a switching element 34 with positive terminal 14.

Switching element 34 may take various forms; in its most simple form, it is merely an adjustable resistor, which controls the operating frequency, to some extent, of the motor. To facilitate starting, a highly temperature dependent resistor has been found particularly suitable. Such a resistor has a low resistance when connected and thus permits rapid starting. As the motor starts to run, and current flows through resistor 34, its resistance increases and thus the collector current delivered to transistors 28, 29 becomes limited to the desired value.

The circuit element 34 may, also, have other forms; for example, the common circuit element 34 may be a constant current source, such as a transistor which has a Zener diode associated therewith as a reference element. The circuit element may also be a transistor which functions as a control element for an automatic speed controller for the motor. The resistance may be a voltage controlled resistance, a temperature dependent resistance, or a combination of resistances with fixed value, together with variable resistors; the latter is a particularly suitable combination when the circuit of the present invention is to be used when connected to the battery of an automotive vehicle.

Operation: As noted above, the base currents of transistors 15, 16, in FIG. 1 are in opposition and flow through the coils 11, 12, in opposition to the collector currents. In the form of the invention in accordance with FIG. 2, this undesirable effect is essentially eliminated, since the base currents for transistors 15, 16 are derived directly from the positive terminal 14 of the source. The base currents for the power switching transistors 15, 16 thus no longer flow through the coils 10, 11, of the motor. These coils, rather, only have to carry the base currents of the control switching transistors 28, 29, respectively. These control switching transistors may have very small base currents, that is, 5 to 10 percent of the base currents of power transistors 15, 16, and thus do not give rise to a magnetic field which detracts from the power to be derived from the motor due to the field which is principally energized.

Basically, the operation of the circuit is similar to that previously described in connection with FIG. 1. One of the two transistors 15, 28 or 16, 29, respectively, are conductive; the other pair is blocked. When the collector current through the power transistors 15, 16 saturates, change in flux, due to the inductivity of the windings, causes a pulse which switches the associated switching transistor 28, 29 respectively. The windings 10, 11 are of course inductively coupled through the stator iron core structure of the motor 12. The desired operating frequency, and thus motor speed can be adjusted by adjusting the resistance of the control element 34.

Figure 3:
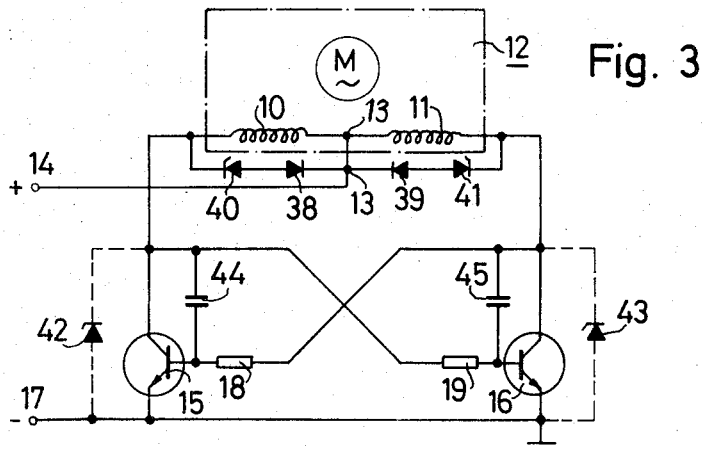
FIG. 3 is another embodiment illustrating additional circuit components to suppress voltage peaks due to switching of the motor inductances.

Embodiment of FIG. 3: The general circuit arrangement is similar to that of FIG. 1. Inductive voltage peaks which arise when the transistors 15, 16 switch over are suppressed by circuit elements shown in this embodiment. The cathodes of a pair of diodes 38, 39 are connected to the center tapped junction 13 of the two motor windings 10, 11. The anode of diode 38 is connected to the anode of a Zener diode 40; the anode of diode 39 is connected to the anode of a Zener diode 41. The cathodes of the two Zener diodes are connected to the outer ends of the respective windings 10, 11. If desired, and under cases of extremely high voltage peaks, or alternatively, Zener diodes 42, 43 can be connected across the emitter-collector paths of the transistors 15, 16, respectively, the Zener diodes being poled oppositely to the junctions of the transistors. These Zener diodes 42, 43 are preferably provided if the transistors 15, 16 are subject to flash-over, or burn-through upon high voltage, that is, if the transistors cannot tolerate high inverse voltages. Capacitors 44, 45 may also be provided, or additionally to the Zener diodes, connected between the base and the collector of the respective transistors. Zener diodes 42, 43 of course have a predetermined breakdown voltage; with respect to Zener diodes, the capacitors have the advantage that they are effective at all operating potentials. The value of the capacitors must be matched to the value of the inductivity of the associated winding 10, 11, respectively.

Operation of embodiment of FIG. 3: The basic operation of the motor fed from a d-c source is similar to that of FIG. 1. When the transistor 15 is conductive, for example, diode 38 prevents flow of current through Zener diode 40, and Zener diode 42 is likewise blocked since its Zener voltage is so set that, under normal operating condition, it will not break down. A suitable Zener voltage for diodes 42, 43 or for Zener diodes 40, 41 is 30V, assuming an operating voltage of about 12–14V between terminals 14, 17. When transistor 15 blocks, since its collector current has reached saturation, the winding 10 will have a voltage peak induced therein, which voltage peak is greater than the breakdown voltage of the diodes 40, 42, so that Zener diode 40 will break down and a current can flow over diode 38. Thus, the diodes 38, 40 will short-circuit the current due to the inductive energy stored in inductance 10. Zener diode 42 protects the emitter-collector path of the transistor 15. Upon change-over, Zener diodes 41 and diode 39, as well as Zener diode 43 will operate similarly with respect to transistor 16, and then the cycle will repeat. The protective elements and circuits of FIG. 3 may, of course, be used in conjunction with the circuit of FIG. 2.

Figure 4:
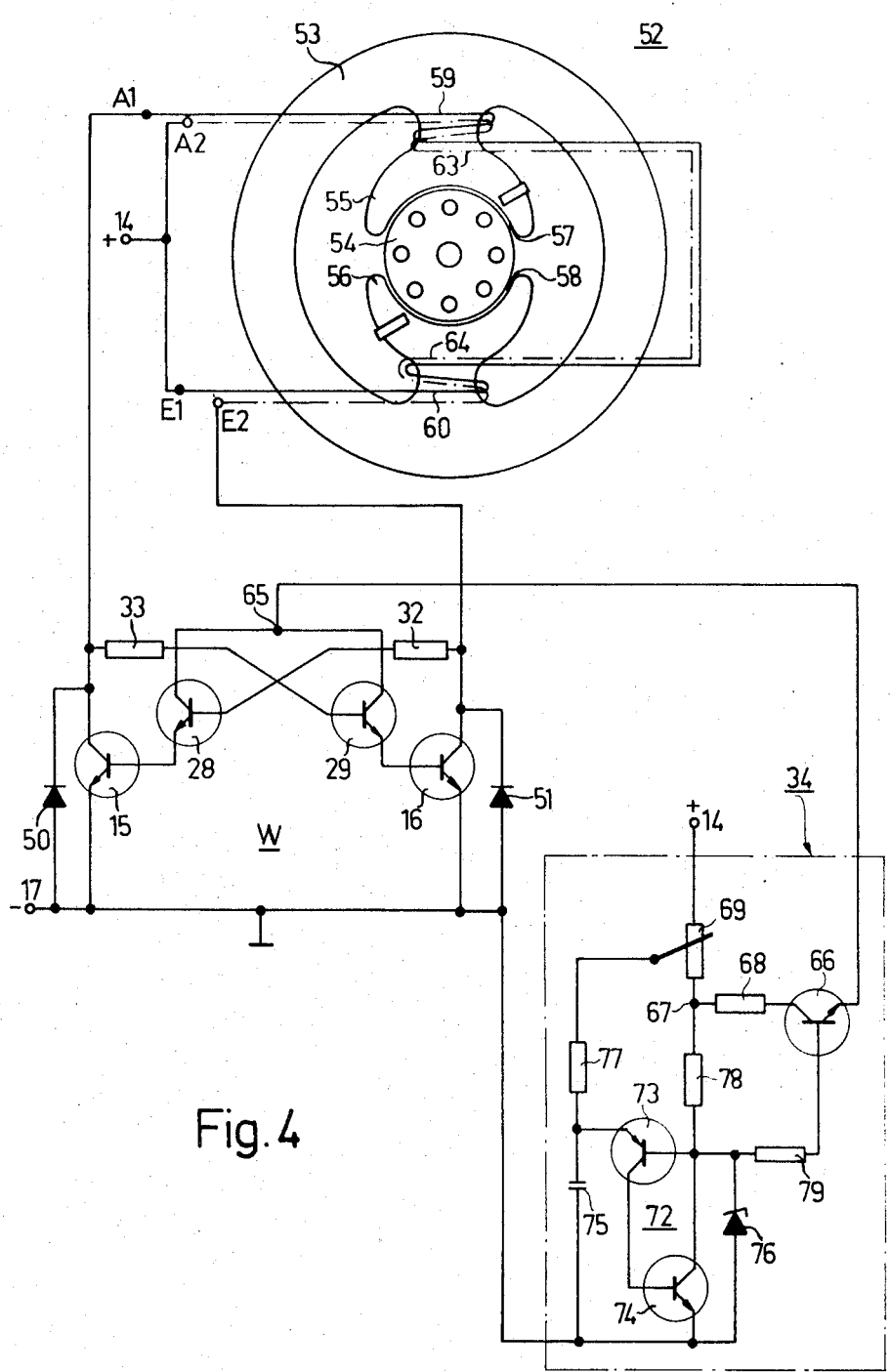
FIG. 4 is a schematic diagram of another embodiment of the inverter.

Embodiment of FIG. 4: The circuit of FIG. 4 is similar to that of FIG. 2; it has additional, separate distinct features which may be separately used with anyone of the circuits and not necessarily in the combination of FIG. 4.

A shaded pole motor 52 has a stator 53 and a short-circuited rotor 54. The two salient poles 55, 56 of stator 53 are separated, magnetically, from each other by two air gaps 57, 58. If the windings of the motor are applied to separate salient poles, the magnetic coupling of the two windings is poor. In accordance with the present invention, the halves of the windings are wound in bifilar form, and both windings cover both poles 55, 56. One half of the winding extends from terminal A1 to terminal E1; this half of the winding is shown in solid lines and extends first in a portion 59 about the pole 55 and then in a portion 60 about the pole 56. The other half of the winding, shown in chain-dotted lines, extends from terminal A2 to terminal E2. The first half 63 is wound about pole 55 and the second half 64 is wound about pole 56. Thus, the magnetic coupling between the two winding halves is greatly improved.

Terminals A1 and E2, forming the opposite outer ends of the two winding halves are connected as in FIG. 2; the center tap of the two windings, formed of terminals A2 and terminals E1 is connected to a source of positive potential at 14. The emitter-collector paths of transistors 15, 16 are connected in parallel with diodes 50, 51, respectively, the diodes being poled oppositely to the junctions of the transistors.

Operation: Let it be assumed that terminal 65 is connected, over circuit 34, to a source of positive voltage 14, and that transistor 15 is conductive. Current will flow through windings 59, 60. As transistor 15 blocks, the winding half would have a high potential induced therein which, in this embodiment, may rise to about 80V. Thus, point A1 would have a potential of about +80V thereat. Due to the tight coupling of the bifilar windings, this voltage is transferred to the other half of the winding 63, 64, so that diode 51, at point E2, will have a potential of about −40V. This potential, however, is clamped by diode 51 to chassis (the diode being poled to be conductive in this direction) so that the actual potential at point E1 will have a value of at the most −1V. By transformer action, the voltage at the winding halves 59, 60 will likewise be reduced to about +40V, so that transistor 15 need only be designed to have a peak inverse voltage of half the voltage peak as that in accordance with the circuit of FIG. 2. Likewise, the energy stored in the winding halves 59, 60 is transferred, by transformer action, over diode 51 back into the direct current network represented by terminals 14, 17. If this is a battery, the overall efficiency of the circuit is substantially improved. Due to the decrease of the voltage peaks, the motor will operate more quietly, and less subject to vibration and surges, since sudden changes in magnetic forces arising when the transistor blocks, are reduced. The forces acting on the rotor, operating within the air gap, become much more symmetrical than in the embodiment of FIG. 2. This is achieved primarily due to the tight coupling of the bifilar windings, and particularly when combined with the circuit as disclosed.

When the transistor 15 blocks, transistor 16 becomes conductive and the same cycle will repeat, as discussed above.

The frequency of the inverter formed by the transistors 15, 16, in the circuits of FIGS. 1–3, is essentially dependent on the characteristics of the transistors and the circuit parameters, which include the motor reactance. The reactance of the motor depends on the slip of the rotor. This parameter, namely motor slip, changes with loading on the motor, and thus the frequency of switch-over changes with loading. The dependence of frequency on loading is particularly disadvantageous when the motor is first started. For rapid starting with high torque, it would be desirable that the frequency, upon starting, is low; this frequency should increase as the operating speed is increased. In actual practice, however, the relationships of frequency and loading are reversed in the circuits of FIGS. 1–3, that is, when the circuit is first started, the change-over frequency of transistors 15, 16 is highest and decreases as the motor picks up speed. This has as a result a rather high start-up time until the motor reaches nominal speed.

The specific configuration of the circuit 34 of FIG. 4 eliminates this disadvantage, since the frequency of the inverter can be made essentially independent of motor speed.

The positive line 14, connected to junction 65, is connected over circuit 34 which acts as a periodic chopper or interruptor. It includes an npn transistor 66, connected to the source of positive potential over a pair of resistors 68, 69, the resistors having a junction 67. The values of the resistors 68, 69 are so adjusted that the base current flowing over transistors 28, 29 to the transistors 15, 16 is large enough in order to reliably saturate transistors 15 and 16.

The change of state of transistor 66, that is, from blocking to conductive and back, is controlled by an oscillator 72. This oscillator may have various forms; in the illustrated example, a pnp transistor 73 is connected to an npn transistor 74, the emitter of transistor 73 and the emitter of transistor 74 being bridged by a capacitor 75. The collector of transistor 73 is connected to the base of the transistor 74. The collector of transistor 74 is connected to the base of transistor 73, and to the cathode of a Zener diode 76. The anode of the Zener diode is likewise connected to the emitter of transistor 74, to the other terminal of capacitor 75 and to chassis.

The emitter of transistor 73 is connected over a resistance 77 to the tap point of resistance 69, which is formed as a potentiometer. A resistance 78 interconnects junction 67 and the base of transistor 73. A coupling resistance 79 connects from the base of transistor 73 to the base of transistor 66.

Operation of the circuit 34: The voltage of the base, and thus also the voltage of the emitter of transistor 73 is clamped by the Zener diode 76 to a constant voltage value with respect to chassis terminal 17. The voltage at the terminals 14, 17 rises, the voltage across resistance 77 will increase. As a result, capacitor 75 is charged slowly when the voltage is low, and is charged rapidly when the supply voltage is high, the charge being effected over resistance 77. When the capacitor 75 reaches a certain predetermined voltage, transistor 73 becomes conductive and a base current will flow to transistor 74. This will cause transistor 74 to become conductive so that the previously conductive transistor 66 will block, until the condenser 75 had discharged sufficiently (through transistors 73 and 74) and transistors 73, 74 then can block again upon the voltage across capacitor 75 reaching the predetermined value with respect to the Zener voltage of Zener diode 76. By suitable selection of the three components, capacitance of capacitor 75; resistance of resistor 77; and breakdown voltage of Zener diode 76, the change in frequency, that is, the rise in frequency with rise in supply voltage can be controlled, and adjusted in any desired relationship. Thus, the change in frequency can be made directly proportional to change in supply voltage, linearly, or non-linearly, directly proportional, or with a multiplication factor. It is also possible to so adjust the parameters of these circuit elements that the frequency of interruption of the transistor 66 will be essentially independent of supply voltage.

Transistor 66, when conductive, supplies base current to the transistors 15, 16, over transistors 28, 29, to cause the transistors 15, 16 to conduct saturation current. When the transistor 66 blocks, the base current is interrupted and the current will switch from transistor 15 to transistor 16, or vice versa, since the voltage induced in the winding halves, upon turn-off of transistors 15, 16 are coupled over resistors 32, 33 to the control transistors of the previously non-conductive power transistor, as seen in FIG. 4. This circuit arrangement essentially effects a frequency division in the relationship 2 : 1, without a specific frequency dividing stage being necessary.

The frequency control circuit 34 need not have the form shown in FIG. 4, but various circuits may be used. The specific control circuit is simple and reliable. Many changes in the circuit may, of course, be made.

The circuit of FIG. 4 thus has the particular features that the tight magnetic coupling of the motor windings, particularly in combination with the counter poled diodes 50, 51 in a very simple manner provides for a substantial improvement in efficiency, and a reduction in motor noise. As an additional feature, the inverter W is no longer controlled solely by the inductances of the motor windings but, rather, is clamped to a predetermined frequency by an outside oscillator. This decreases the time which the motor requires to reach nominal speed from rest position. As a further feature, the frequency of the oscillator can be controlled to be selectively proportional to supply voltage; for example, the motor speed may be made directly proportional or, proportional in accordance with desired mathematical relationships, with respect to supply voltage. This is particularly advantageous when the motor is used, for example, for a fan, blower or the like in which the speed should be automatically matched to a certain operating voltage. This is not normally possible when the motor is directly coupled to an a-c supply network. In order to match motor speed to supply voltage (rather than being clamped to supply frequency), the circuit arrangement of FIG. 4 can be used in combination with a rectifier (not shown) which rectifies voltage from a supply network, and then supplies d-c to terminals 14, 17 which, as far as the motor is concerned, is reconverted to a-c for optimum motor performance. The power consumption of the motor can be reduced by this circuit within ranges of design operating voltages.

Various changes and modifications may be made in the circuits and the motor in accordance with the present invention.

We claim:

1. Brushless dynamo electric machine adapted for connection to a d-c supply having a pair of main windings (10,11) and power transistor means (15, 16) connected to the main windings to alternately, cyclically, connect one or the other of said windings with the d-c supply, so that said windings form a load for said power transistors, comprising:

a pair of control transistors (28, 29), connected to the main windings in a multivibrator circuit, conduction of said control transistors being controlled by current flow in said main windings so that said main windings additionally form control inductances for said control transistors to control the conduction of the power transistors (15, 16), the emitter collector paths of the control transistors (28, 29) being conected to carry the base current of the power transistor (15, 16) to isolate the base current of the power transistor (15, 16) from the windings (10, 11) of the machine and prevent generation of a counter-acting braking torque therein, said windings being tightly coupled inductively by the magnetic structure of said machine;

and a control circuit (34; 32, 33) additionally controlling conduction of the control transistors (28, 29) to control, in turn, conduction of said power transistors(15, 16), the control circuit being connected between the emitter-collector paths of the control transistors (28, 29) and the supply terminal (+14V) therefore, and comprising an oscillator (72) and a controllable semi-conductor switch (66) connected to and controlled by said oscillator, the oscillator (72) controlling the switching rate of the semi-conductor switch (66), and said switch (66) periodically interrupting current supply to the emitter-collector path of the control transistors (28, 29) to control the speed of the machine.

2. Machine according to claim 1, further comprising voltage limiting means (38, 40; 39, 41; 42, 43; 50, 51) connected in circuit with the power transistors (15, 16) and including diodes, poled oppositely to the direction of conduction thereof, to prevent application of inductively generated voltage peaks from the windings of the dynamo electric machine thereto.

3. Machine according to claim 1, wherein the motor windings are at least in part bifilar windings wound on the same core element (53, 55, 56) of the machine to be tightly coupled inductively by the core structure threof;

and bypass diodes (50, 51) are provided, each connected across a power transistor (15, 16), the diode paths being poled oppositely to the direction of conduction of the power transistor.

4. Machine according to claim 1, wherein the oscillator (72) is connected to be energized from the d-c source and connected to have an output frequency which has a predetermined relationship with respect to voltage of the d-c source.

5. Machine according to claim 5, wherein the predetermined relationship provides for a rise in output frequency of the oscillator, and hence rise of the switching rate of the controllable semi-conductor switch (66) with rise in voltage of the d-c source.

6. Shaded pole motor having a stator structure (53,55,56) and at least two windings (59, 60; 63, 64) on the stator structure inductively tightly coupled by the core structure thereof, at least two power transistors (15, 16), having a respective collector-emitter path connected, each between an end terminal (A1, E1) of a winding on the stator structure and a source of supply so that the respective windings will form loads for said power transistors;

oscillator means (72) controlling conduction of the power transistors (15, 16) cyclically, alternately, to connect, upon conduction, a respective motor winding to the source of supply (14, 17);

and voltage-sensitive means (75, 76, 77, 69) connecting the oscillator (72) to the source of supply, the relative parameters of said voltage sensitive means determining the relationship of oscillator frequency with respect to supply voltage of said source, and thus determining the switching rate of the power transistors (15, 16) with respect to said supply voltage;

and wherein a pair of control transistor means (28, 29) are provided having their bases connected to said windings to be controlled between conductive and non-conductive state in accordance with current flow in said windings due to alternating conduction of said power transistors, and having one terminal of their emitter-collector paths connected to the base supply of the power transistors (15, 16) respectively, and the other terminal of their emitter-collector paths connected to the oscillator (72) to control switch - over of said power transistors and alternate energization of said windings, to periodically intertupt, at oscillator frequency, the supply of current to the bases of the power transistors. and 7. Motor according to claim 6 wherein a controlled switch (66) is provided connecting the oscillator (72) to the other terminals of the emitter-collector paths of the control transistors (28, 29), the switching rate of the controlled switch being determined by the frequency of oscillations of the oscillator (72), the controlled switch (66) providing a potential to the control transistors to cause conduction thereof, cyclically and alternately, in accordance with the frequency of oscillations derived from said oscilaltor.

8. Motor according to claim 6 wherein the motor windings (59, 60; 63, 64) are at least in part multi-filar windings wound on the same core element of the motor to be tightly coupled inductively therewith.

* * * * *

UNITED STATES PATENT OFFICE
CERTIFICATE OF CORRECTION

Patent No. 3,780,363            Dated December 18, 1973

Inventor(s) Benno DOEMEN et al

It is certified that error appears in the above-identified patent and that said Letters Patent are hereby corrected as shown below:

In the Claims:

Claim 6, column 10, lines 11, 12, 13, 14, cancel and change to read:

--and alternate energization of said windings to isolate the base current of the power transistors from said windings and periodically interrupt, at oscillator frequency, the supply of current to the bases of the power transistors.--

Signed and sealed this 16th day of April 1974.

(SEAL)
Attest:

EDWARD M. FLETCHER, JR.
Attesting Officer

C. MARSHALL DANN
Commissioner of Patents